United States Patent
Harding

(10) Patent No.: US 7,285,767 B2
(45) Date of Patent: Oct. 23, 2007

(54) METHODS AND APPARATUS FOR INSPECTING AN OBJECT

(75) Inventor: Kevin George Harding, Nishkayuna, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/256,886

(22) Filed: Oct. 24, 2005

(65) Prior Publication Data
US 2007/0090280 A1    Apr. 26, 2007

(51) Int. Cl.
*G01J 1/36*     (2006.01)
*G01J 4/00*     (2006.01)
*H01L 27/00*    (2006.01)
*G01N 21/86*    (2006.01)

(52) U.S. Cl. .............. 250/225; 250/208.1; 250/559.09; 250/559.05; 356/369

(58) Field of Classification Search .. 356/237.1–237.5, 356/238.1–238.3, 239.1–239.8, 240.1, 241.1–241.6, 356/369, 604, 603, 606, 453, 487, 491; 250/225, 250/559.01, 559.09, 208.1, 226, 559.05
See application file for complete search history.

(56) References Cited

U.S. PATENT DOCUMENTS

| | | |
|---|---|---|
| 4,585,947 A | 4/1986 | Liptay-Wagner et al. |
| 4,686,374 A | 8/1987 | Liptay-Wagner et al. |
| 4,864,123 A * | 9/1989 | Mizutani et al. ............ 250/225 |
| 5,307,151 A | 4/1994 | Hof et al. |
| 5,910,841 A * | 6/1999 | Masao ........................ 356/369 |
| 6,028,671 A | 2/2000 | Svetkoff et al. |
| 6,064,759 A | 5/2000 | Buckley et al. |
| 6,559,942 B2 * | 5/2003 | Sui et al. ..................... 356/369 |
| 6,639,685 B1 | 10/2003 | Gu et al. |
| 6,678,057 B2 | 1/2004 | Harding et al. |
| 6,714,301 B2 * | 3/2004 | Otsuki et al. ............... 356/369 |

(Continued)

FOREIGN PATENT DOCUMENTS

WO    2004013566 A2    2/2004

OTHER PUBLICATIONS

Qinguing Hu et al., "Shiny Parts Measurement Using Color Separation," Oct. 24, 2005, GE GRC Schenectady, NY (8 pages).
Search Report;Reference No. 165253/11842, Application No. 06255431.6—2213; Place of Search—Munich; Dated Feb. 23, 2007; 6 pgs.

*Primary Examiner*—Que Tan Le
*Assistant Examiner*—Pascal M. Bui-Pho
(74) *Attorney, Agent, or Firm*—William Scott Andes; Armstrong Teasdale LLP

(57) ABSTRACT

A method for inspecting an object using a structured light measurement system that includes a light source and an imaging sensor. The method includes emitting light from the light source, polarizing each of a plurality of different wavelengths of the light emitted from the light source at different polarization angles, projecting light emitted from the light source onto a surface of an object, receiving light reflected from the object surface with the imaging sensor, and analyzing the light received by the imaging sensor to facilitate inspecting at least a portion of the object.

19 Claims, 4 Drawing Sheets

U.S. PATENT DOCUMENTS

| | | |
|---|---|---|
| 2002/0014577 A1 | 2/2002 | Ulrich et al. |
| 2003/0112447 A1 | 6/2003 | Harding et al. |
| 2003/0223083 A1 | 12/2003 | Geng |
| 2004/0026622 A1 | 2/2004 | DiMarzio et al. |
| 2005/0073590 A1* | 4/2005 | Mamiya .................. 348/222.1 |
| 2005/0111726 A1 | 5/2005 | Hackney et al. |

* cited by examiner

METHODS AND APPARATUS FOR INSPECTING AN OBJECT

BACKGROUND OF THE INVENTION

This application relates generally to inspecting objects, and more specifically to methods and apparatus for inspecting objects using a light measurement system.

Objects are sometimes inspected, for example, to determine a size and/or shape of all or a portion of the object and/or to detect defects in the object. For example, some gas turbine engine components, such as turbine or compressor blades, are inspected to detect fatigue cracks that may be caused by vibratory, mechanical, and/or thermal stresses induced to the engine. Moreover, and for example, some gas turbine engine blades are inspected for deformations such as platform orientation, contour cross-section, bow and twist along a stacking axis, thickness, and/or chord length at given cross-sections. Over time, continued operation of the object with one or more defects may reduce performance of the object and/or lead to object failures, for example, as cracks propagate through the object. Accordingly, detecting defects of the object as early as possible may facilitate increasing the performance of the object and/or reducing object failures.

To facilitate inspecting objects, at least some objects are inspected using a light measurement system that projects a structured light pattern onto a surface of the object. The light measurement system images the structured light pattern reflected from the surface of the object and then analyzes the deformation of the reflected light pattern to calculate the surface features of the object. More specifically, during operation, the object to be inspected is typically coupled to a test fixture and positioned proximate to the light measurement system. A light source is then activated such that emitted light illuminates the object to be inspected. However, a resultant image of the object may include noise caused by multiple bounce reflections of the emitted light. Such noise may result in reduced image quality and poor measurement results, possibly leading to an incorrect interpretation of surface features of the object. For example, light reflected off of prismatic surfaces of the object may cause multiple bounce reflections. Moreover, and for example, multiple bounce reflections may be caused by inter-reflections between the object and portions of the test fixture illuminated by the light source. For example, multiple bounce reflections may be caused if the test fixture has a shape or finish that casts reflections on the object, and/or if the object has a relatively mirror-like finish that reflects an image of the test fixture.

Some light measurement systems use a pair of crossed polarized filters to reduce, eliminate, and/or identify noise caused by multiple bounce reflections. However, crossed polarized filters may require multiple images to be taken of the object to reduce or eliminate multiple bounce reflections because reducing or eliminating such reflections may require different orientations of the filters. Moreover, multiple images may also be required to analyze slope, texture, material, and/or other features of the object because analyzing differently angled reflections may require different orientations of the filters.

BRIEF DESCRIPTION OF THE INVENTION

In one aspect, a method is provided for inspecting an object using a structured light measurement system that includes a light source and an imaging sensor. The method includes emitting light from the light source, polarizing each of a plurality of different wavelengths of the light emitted from the light source at different polarization angles, projecting light emitted from the light source onto a surface of an object, receiving light reflected from the object surface with the imaging sensor, and analyzing the light received by the imaging sensor to facilitate inspecting at least a portion of the object.

In another aspect, a method is provided for inspecting an object using a light measurement system that includes a light source and an imaging sensor. The method includes emitting light from the light source, polarizing a first wavelength of light emitted from the light source at a first polarization angle, polarizing a second wavelength of light emitted from the light source at a second polarization angle that is rotated from the first polarization angle, wherein the first and second wavelengths are different, projecting light emitted from the light source onto a surface of an object, receiving light reflected from the object surface using the imaging sensor, creating an image of light reflected from the object and received by the imaging sensor, and using the image to analyze a change of at least one of the first and second polarization angles after the light has been reflected from the object.

In another aspect, a structured light measurement system for inspecting an object includes a structured light source configured to project structured light onto a surface of the object, a first polarizing filter configured to polarize a first wavelength of structured light emitted by the structured light source at a first polarization angle, a second polarizing filter configured to polarize a second wavelength of structured light emitted by the structured light source at a second polarization angle different from the first polarization angle, wherein the first and second wavelengths are different, and an imaging sensor configured to receive structured light reflected from the object surface.

DETAILED DESCRIPTION OF THE INVENTION

Figure 1:
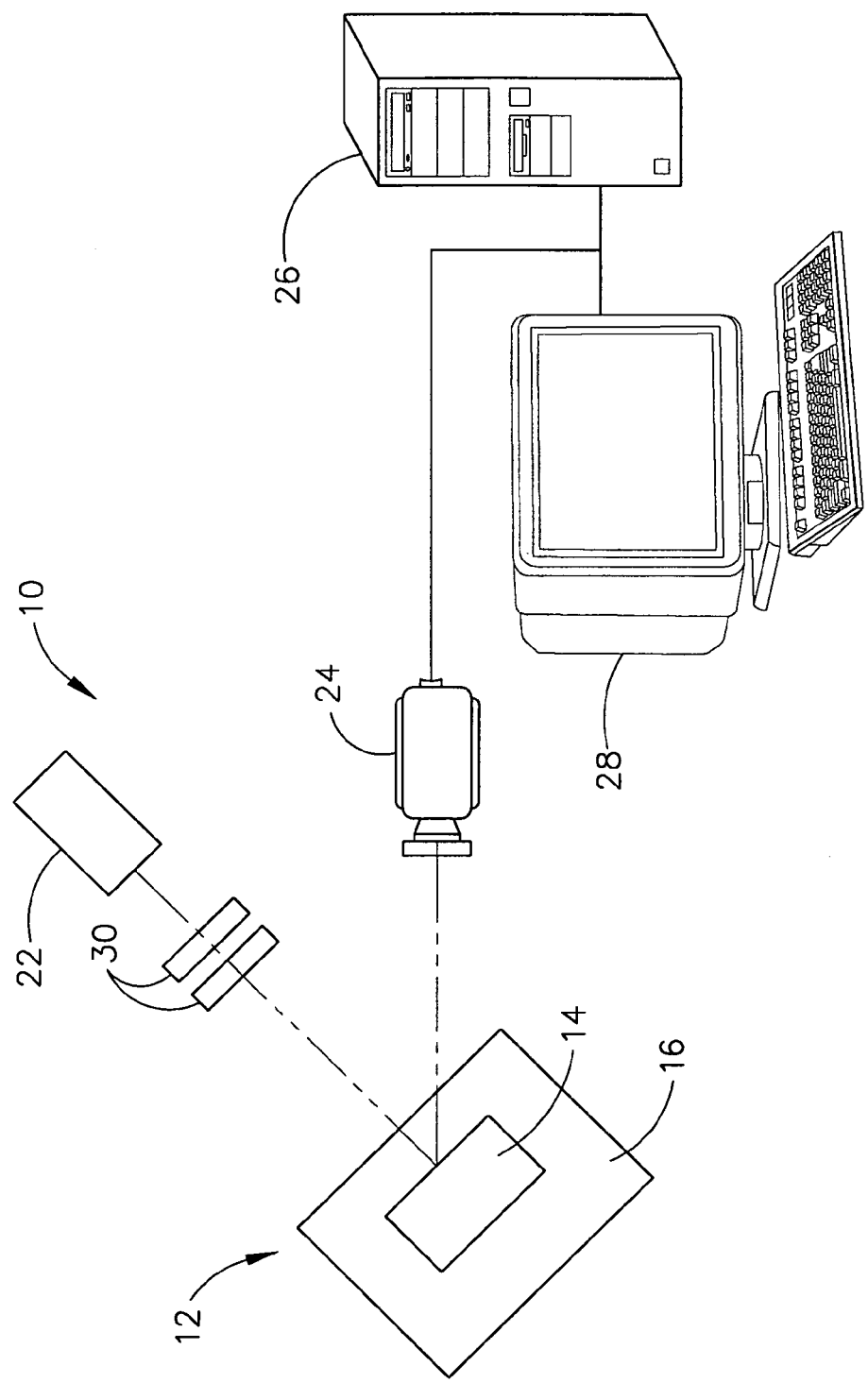
FIG. 1 is a block diagram of an exemplary embodiment of a structured light measurement system.

FIG. 1 is a block diagram of an exemplary embodiment of a structured light measurement system 10 that is used to measure a plurality of surface features of an object 12. For example, system 10 may be used to inspect and determine surfaces of object 12, wherein the surfaces may include features such as tilts, bends, twists, and/or warps when compared to a model representative of object 12.

In the exemplary embodiment, object 12 is a rotor blade, such as, but not limited to, a compressor or a turbine blade utilized in a turbine engine. Accordingly, and in the exemplary embodiment, object 12 includes an airfoil 14 extending outwardly from a platform 16. While the following description is directed to inspecting gas turbine engine blades, one skilled in the art will appreciate that inspection system 10 may be utilized to improve structured light imaging for any object.

System 10 also includes a structured light source 22, such as, but not limited to, a white light lamp, a light emitting diode (LED), a laser, a liquid crystal display (LCD) device, a liquid crystal on silicon (LCOS) device, and/or a digital micromirror device (DMD) device. System 10 also includes one or more imaging sensors 24 that receive structured light reflected from object 12. In the exemplary embodiment, imaging sensor 24 is a camera that receives and creates images using structured light reflected from object 12, although other imaging sensors 24 may be used. One or more computers 26 process images received from sensors 24, and a monitor 28 may be utilized to display information to an operator. Computer(s) 26 are programmed to perform functions described herein, and as used herein, the term computer is not limited to just those integrated circuits referred to in the art as computers, but broadly refers to computers, processors, microcontrollers, microcomputers, programmable logic controllers, application specific integrated circuits, and other programmable circuits, and these terms are used interchangeably herein.

Figure 2:
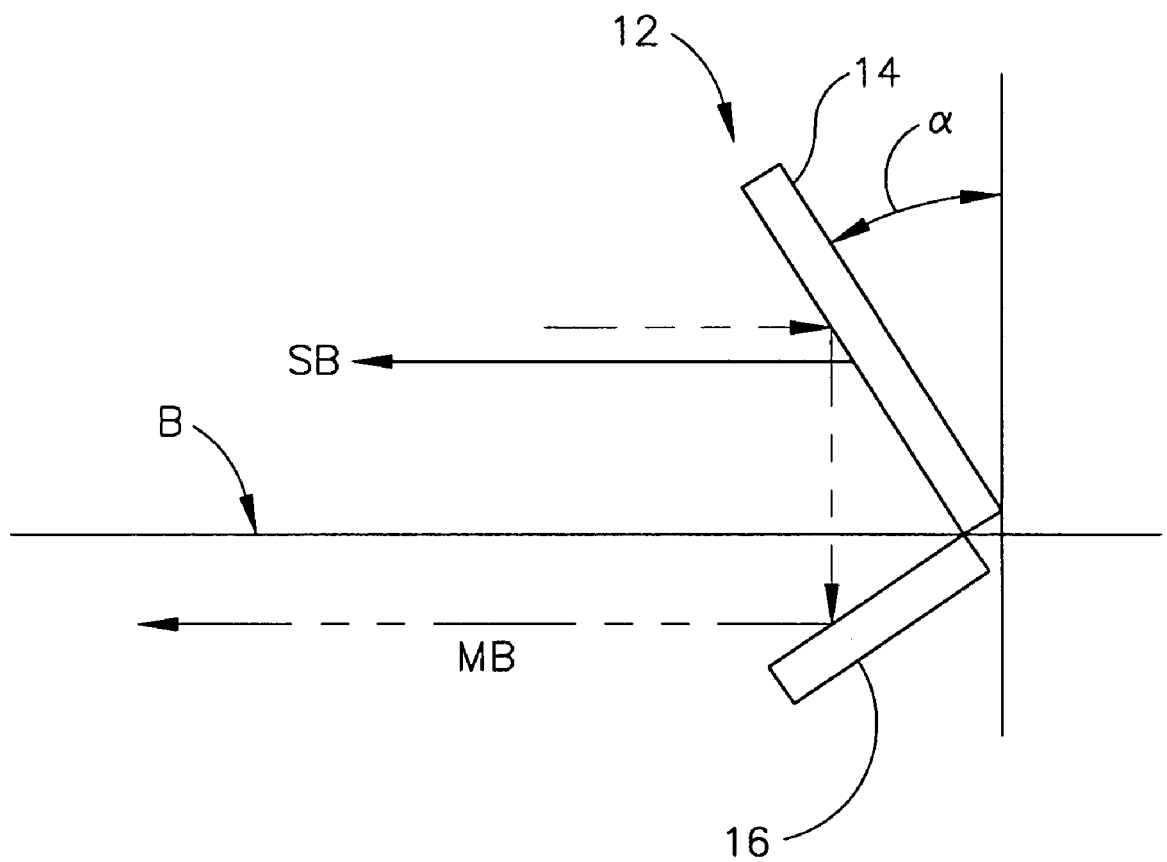
FIG. 2 is a side sectional view of an object under inspection, illustrating single and multiple bounce light paths.

FIG. 2 is a side sectional view of object 12. During operation, an object to be inspected, for example object 12, is coupled to a test fixture (not shown) and positioned proximate to system 10. In some embodiments, object 12 is orientated relative to light source 22 (shown in FIG. 1) with an angle α of orientation that enables a view to be presented to imaging sensors 24 (shown in FIG. 1) such that a plane β defined by light source 22 and imaging sensors 24 substantially bisects one or more prismatic features of object 12. For example, in the exemplary embodiment, airfoil 14 and platform 16 each define a prismatic feature of object 12.

Light source 22 is then activated causing emitted light to illuminate object 12. Imaging sensors 24 obtain an image of the emitted light pattern projected onto object 12. However, a resultant image of object 12 may include noise caused by multiple bounce reflections of the emitted light. Such noise may result in a reduced image quality and poor measurement results, possibly leading to an incorrect interpretation of surface features of object 12. For example, light reflected off of prismatic surfaces (e.g., intersecting surfaces of airfoil 14 and platform 16) of object 12 may cause multiple bounce reflections, as illustrated in FIG. 2. Directly reflected light paths, sometimes referred to as single bounce reflections, are indicated as SB in FIG. 2, and multiple bounce reflections are indicated as MB in FIG. 2. Moreover, and for example, multiple bounce reflections MB may be caused by inter-reflections between object 12 and portions of the test fixture illuminated by light source 22. For example, multiple bounce reflections MB may be created if the test fixture has a shape or finish that casts reflections on object 12, and/or if object 12 has a relatively mirror-like finish that reflects an image of the test fixture.

To identify features of the object and/or multiple bounce reflections MB, system 20 includes two or more polarizing filters 30 for polarizing different wavelengths, or colors, of the light emitted from light source 22 at different polarization angles. More specifically, each polarizing filter 30 polarizes a particular wavelength of light emitted from light source 22 at a different polarization angle from other wavelengths. As polarized light reflects off object 12, the polarization angle of each wavelength changes. The change in the polarization angle of each wavelength can then be analyzed to determine multiple bounce reflections MB and/or features of object 12 such as, but not limited to, surface texture, surface orientation, and/or a material used in fabricating object 12. For example, in some embodiments, a change in a ratio defined between the polarization angles of different wavelengths is analyzed to determine multiple bounce reflections and/or features of object 12. Because different wavelengths of light projected onto object 12 are polarized at different angles, multiple polarization states can be analyzed using only a single image of light reflected from object 12 and received by imaging sensor 24. Accordingly, multiple bounce reflections MB and/or features of object 12 can be determined using a single image of light received by imaging sensor 24, rather than using multiple images taken a different polarization illuminations.

Polarizing filters 30 may be configured to polarize any wavelength of light emitted by light source 22 at any polarization angle. In some embodiments, and as shown in FIG. 1, polarizing filters 30 are positioned at least partially between light source 22 and object 12 for polarizing light emitted by light source 22 before it is reflected from object 12. Although two polarizing filters 30 are illustrated in FIG. 1, system 10 may include any number of polarizing filters 30 used to polarize any number of different wavelengths of light at different polarization angles. In some embodiments, suitable color filters (not shown in FIG. 1), such as, but not limited to, dichroic mirrors, may be positioned at least partially between light source 22 and polarization filters 30 for separating two or more wavelengths of light for polarization thereof. Additionally or alternatively, suitable color filters (not shown in FIG. 1), such as, but not limited to, dichroic mirrors, may be positioned at least partially between object 12 and imaging sensor 24 for separating two or more wavelengths of light for reception by imaging sensor 24.

Figure 3:
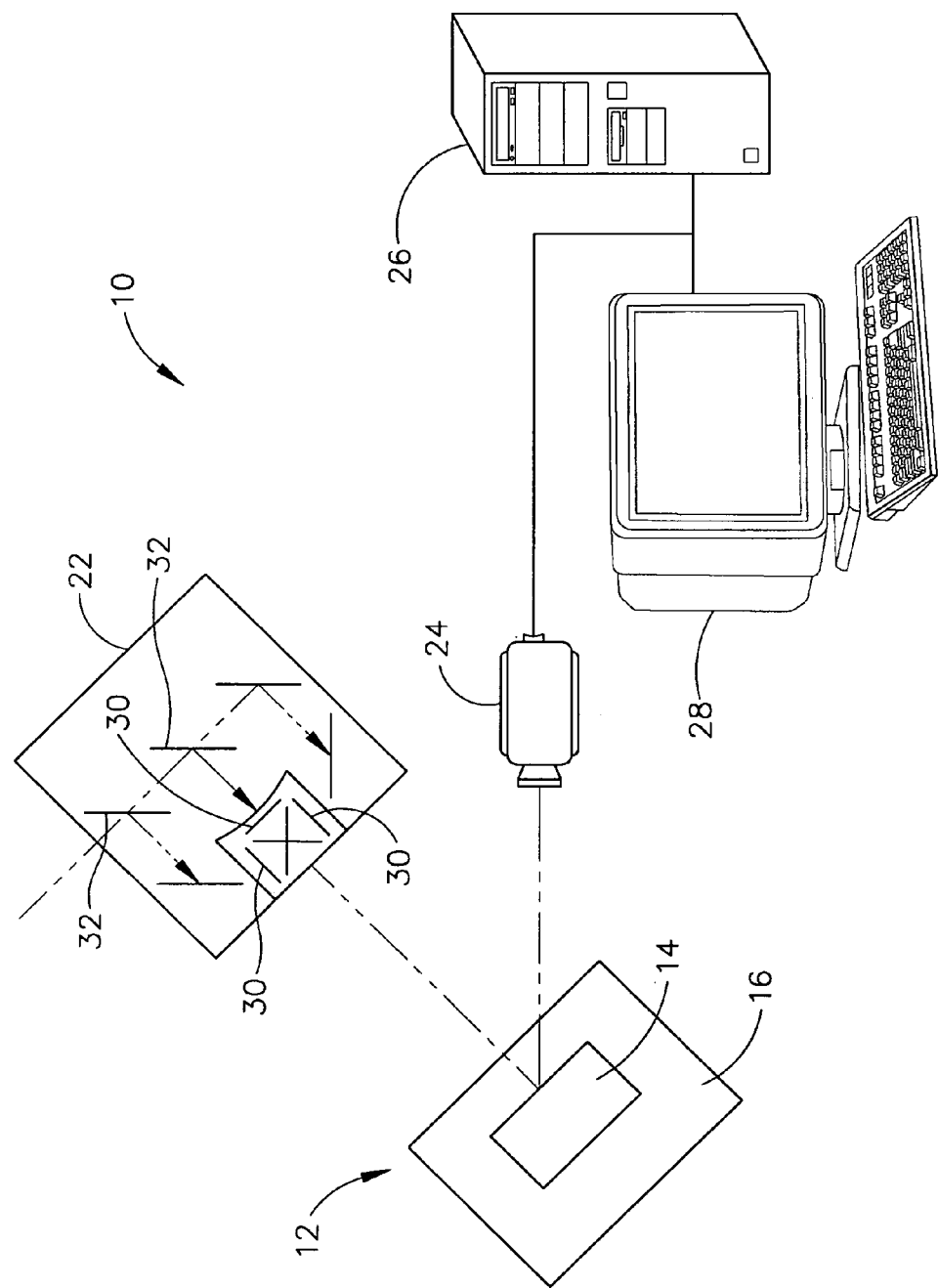
FIG. 3 is a block diagram of an alternative embodiment of the structured light measurement system shown in FIG. 1.

FIG. 3 is a block diagram of another exemplary embodiment of structured light measurement system 10 wherein light source 22 includes polarizing filters 30. Although three polarizing filters 30 are illustrated in FIG. 3, light source 22 may include any number of polarizing filters 30 for polarizing any number of different wavelengths of light at different polarization angles. In the exemplary embodiment, light source 22 includes two color filters 32, such as, but not limited to, diachronic mirrors. Although two color filters 32 are illustrated, light source 22 may include any number of color filters 32. In operation, color filters 32 separate light generated by light source 22 into three different wavelengths, which are then polarized at three different polarization angles, recombined, and emitted by light source 22 to be projected onto object 12. Of course, other configurations and/or arrangements of lights source 22, polarizing filters 30, any color filters (e.g., color filters 32), imaging sensor 24, and/or other components of system 10 may be used without departing from the scope of system 10, whether described and/or illustrated herein.

Figure 4:
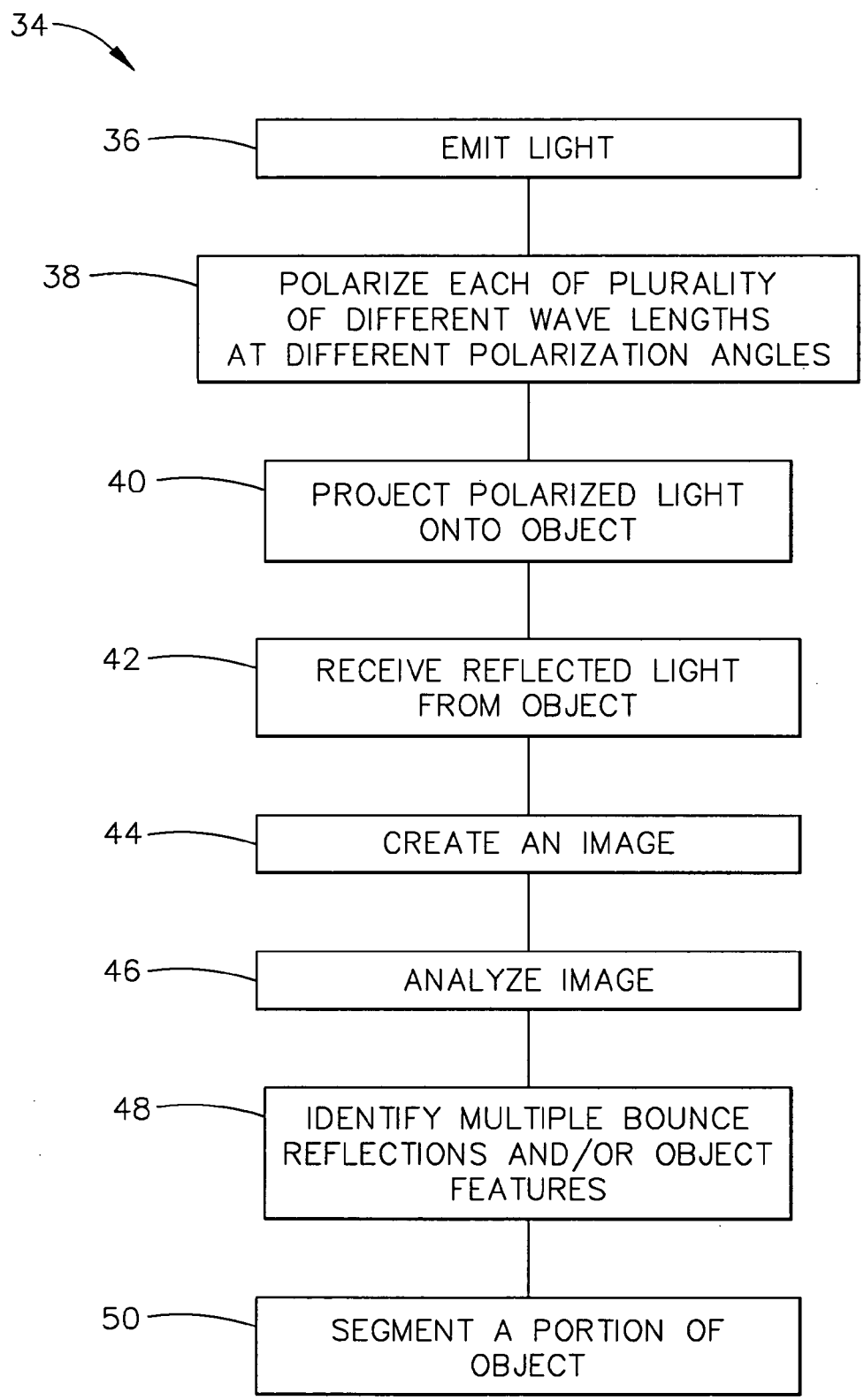
FIG. 4 is a flow chart illustrating an exemplary method for inspecting an object using the structured light measurement system shown in FIGS. 1 or 3.

FIG. 4 is a flow chart illustrating an exemplary embodiment of a method 34 for inspecting object 12 (shown in FIGS. 1-3) using structured light measurement system 10 (shown in FIGS. 1 and 3). Method 34 includes emitting 36 light from light source 22 and polarizing 38 each of a plurality of different wavelengths of the light emitted from light source 22 at different polarization angles. For example, in some embodiments a first wavelength of light emitted by light source 22 is polarized 38 at a first polarization angle and a second, and different, wavelength of light emitted by light source 22 is polarized at a second polarization angle that is rotated from the first polarization angle. Polarized light emitted from light source 22 is projected 40 onto a surface of object 12. Light reflected from object 12 is received 42 by imaging sensor 24 and an image is created 44 therefrom using imaging sensor 24 and/or computer 26. The image is then analyzed 46 to identify 48 multiple bounce reflections MB and/or features of object 12, such as, but not limited to, surface texture, surface orientation, and a material used in fabricating object 12.

For example, reflections from single bounce SB light, multiple bounce MB light, or other variations, are readily identified and selectively extracted from the image using conventional image processing techniques, such as, but not limited to, ellipsometric analysis. In some embodiments, and for example, a change of the polarization angle of each of the plurality of different wavelengths after reflection from object 12 is analyzed to identify and/or selectively extracted multiple bounce reflections from the image. Moreover, and for example, in some embodiments a change of a ratio defined between the polarization angles of at least two different wavelengths is analyzed to identify and/or selectively extracted multiple bounce reflections from the image.

Moreover, and for example, features of object 12, such as, but not limited to, surface texture, surface orientation, and a material used in fabricating object 12 can be readily identified from the image created by light reflected from the object using conventional image processing techniques, such as, but not limited to, ellipsometric analysis. In some embodiments, and for example, a change of the polarization angle of each of the plurality of different wavelengths after reflection from object 12 is analyzed to identify features of object 12. Moreover, and for example, in some embodiments a change of a ratio defined between the polarization angles of at least two different wavelengths is analyzed to identify features of object 12.

The image created by light reflected from object 12 may be analyzed 46 to segment 50 a portion of object 12, for example, based on at least one of surface texture, surface orientation, and a material used in fabricating the portion of the object. For example, specific regions in an image known to contain erroneous or irrelevant information may be digitally masked or blocked from further processing. Similarly, using known information, an image of object 12 undergoing measurement may be correlated or registered to a stored reference image, facilitating identification of differences between object 12 and an ideal model or representation of object 12.

The above-described structured light measurement system 10 may facilitate inspecting object 12 more quickly and efficiently. More specifically, by polarizing different wavelengths of light projected onto object 12 at different polarization angles, multiple polarization states can be analyzed using only a single image of object 12. Accordingly, multiple bounce reflections MB and/or features of object 12 can be determined using a single image of light reflected from object 12, rather than using multiple images taken at different polarization illuminations. Moreover, structured light measurement system 10 may facilitate identifying, reducing, and/or eliminating image noise, such as, but not limited to, multiple bounce reflections MB, simultaneously with determining features of object 12. A technical effect of the methods and systems described and/or illustrated herein includes determining multiple bounce reflections MB and/or features of object 12 using a single image of light reflected from object 12.

Although the systems and methods described and/or illustrated herein are described and/or illustrated with respect to gas turbine engine components, and more specifically an engine blade for a gas turbine engine, practice of the systems and methods described and/or illustrated herein is not limited to gas turbine engine blades, nor gas turbine engine components generally. Rather, the systems and methods described and/or illustrated herein are applicable to any object.

Exemplary embodiments of systems and methods are described and/or illustrated herein in detail. The systems and methods are not limited to the specific embodiments described herein, but rather, components of each system, as well as steps of each method, may be utilized independently and separately from other components and steps described herein. Each component, and each method step, can also be used in combination with other components and/or method steps.

When introducing elements/components/etc. of the assemblies and methods described and/or illustrated herein, the articles "a", "an", "the" and "said" are intended to mean that there are one or more of the element(s)/component(s)/etc. The terms "comprising", "including" and "having" are intended to be inclusive and mean that there may be additional element(s)/component(s)/etc. other than the listed element(s)/component(s)/etc.

While the invention has been described in terms of various specific embodiments, those skilled in the art will recognize that the invention can be practiced with modification within the spirit and scope of the claims.

What is claimed is:

1. A method for inspecting an object using a structured light measurement system that includes a light source and an imaging sensor, said method comprising:
    emitting light from the light source;
    polarizing each of a plurality of different wavelengths of the light emitted from the light source at different polarization angles;
    projecting light emitted from the light source onto a surface of the object;
    receiving light reflected from the object surface with the imaging sensor; and
    analyzing the light received by the imaging sensor to facilitate inspecting at least a portion of the object by analyzing a change of the polarization angle of each of the plurality of different wavelengths of light is reflected from the object.

2. A method in accordance with claim 1 wherein analyzing a change of the polarization of each of the plurality of different wavelengths comprises analyzing a change of a ratio between the polarization angles of at least two different wavelengths of the plurality of wavelengths.

3. A method in accordance with claim 1 wherein analyzing light received by the imaging sensor comprises identifying multiple bounce reflections based on light received by the imaging sensor.

4. A method in accordance with claim 1 wherein analyzing light received by the imaging sensor comprises identifying at least one of a surface texture, a surface orientation, and a material used in fabricating the object based on light received by the imaging sensor.

5. A method in accordance with claim 4 further comprising segmenting a portion of the object based on at least one of the surface texture, the surface orientation, and the material of the object.

6. A method for inspecting an object using a light measurement system that includes a light source and an imaging sensor, said method comprising:
    emitting light from the light source;
    polarizing a first wavelength of light emitted from the light source at a first polarization angle;
    polarizing a second wavelength of light emitted from the light source at a second polarization angle that is rotated from the first polarization angle, wherein the first and second wavelengths are different;

projecting light emitted from the light source onto a surface of the object;

receiving light reflected from the object surface using the imaging sensor;

creating an image of light reflected from the object and received by the imaging sensor; and using the image to analyze a change of at least one of the first and second polarization angles after the light has been reflected from the object.

7. A method in accordance with claim 6 wherein using the image to analyze a change of at least one of the first and second polarization angles comprises using the image to analyze a change of a ratio between the first and second polarization angles.

8. A method in accordance with claim 6 wherein using the image to analyze a change of at least one of the first and second polarization angles comprises identifying multiple bounce reflections based on the change of at least one of the first and second polarization angles.

9. A method in accordance with claim 6 wherein using the image to analyze a change of at least one of the first and second polarization angles comprises identifying at least one of a surface texture, a surface orientation, and a material of the object based on the change of at least one of the first and second polarization angles.

10. A method in accordance with claim 6 further comprising orienting the object with respect to the light source such that light emitted from the light source bisects a prismatic surface of a feature of the object.

11. A method in accordance with claim 6 wherein creating an image comprises creating a single image from the light reflected from the object and received by the imaging sensor, and wherein using the image to analyze a change of at least one of the first and second polarization angles comprises using the single image to analyze a change of each of the first and second polarization angles.

12. A structured light measurement system for inspecting an object, said structured light measurement system comprising:

a structured light source configured to project structured light onto a surface of the object;

a first polarizing filter configured to polarize a first wavelength of structured light emitted by said structured light source at a first polarization angle;

a second polarizing filter configured to polarize a second wavelength of structured light emitted by said structured light source at a second polarization angle different from the first polarization angle, wherein the first and second wavelengths are different; and an imaging sensor configured to receive structured light reflected from the object surface and analyze a change of the first polarization angle and of the second polarization angle after receiving the structured light.

13. A system in accordance with claim 12 wherein said structured light source comprises said first and second polarizing filters.

14. A system in accordance with claim 12 wherein said first and second polarizing filters are positioned at least partially between said structured light source and the object.

15. A system in accordance with claim 12 further comprising:

a first color filter positioned at least partially between the object and said imaging sensor and configured to separate the first wavelength of structured light from structured light reflected from the object surface; and a second color filter positioned at least partially between the object and said imaging sensor and configured to separate the second wavelength of structured light from structured light reflected from the object surface.

16. A system in accordance with claim 15 wherein said first and second color filters comprise dichroic mirrors.

17. A system in accordance with claim 12 wherein said structured light source comprises:

a first color filter configured to separate the first wavelength of structured light from structured light generated by said structured light source; and a second color filter configured to separate the second wavelength of structured light from structured light generated by said structured light source.

18. A system in accordance with claim 17 wherein said first and second color filters comprise dichroic mirrors.

19. A system in accordance with claim 12 wherein said light source comprises at least one of a white light lamp, a laser, a light emitting diode (LED), a liquid crystal display (LCD) device, a liquid crystal on silicon (LCOS) device, and a digital micromirror device (DMD).

* * * * *